United States Patent [19]
Stevens

[11] 3,778,808
[45] Dec. 11, 1973

[54] ELECTRONIC WEIGHT MONITOR

[76] Inventor: George S. Stevens, 2106 Washington Way, Richland, Wash. 99352

[22] Filed: Jan. 17, 1972

[21] Appl. No.: 218,092

[52] U.S. Cl............... 340/282, 340/272, 335/205, 200/85 R, 177/45
[51] Int. Cl. .................... B60q 1/00, H01h 35/02
[58] Field of Search .................. 340/272, 282; 200/85, 86; 335/205, 207

[56] References Cited
UNITED STATES PATENTS

| 3,531,766 | 9/1970 | Henzel | 340/272 X |
|---|---|---|---|
| 3,596,024 | 7/1971 | Smith | 200/86 X |
| 3,611,220 | 10/1971 | Hoffman | 335/207 |
| 3,634,635 | 1/1972 | Ellis | 335/205 X |
| 3,673,526 | 6/1972 | Brevick | 335/205 |
| 2,769,052 | 10/1956 | Beck | 200/85 |

Primary Examiner—Thomas B. Habecker
Assistant Examiner—Scott F. Partridge
Attorney—John W. Kraft

[57] ABSTRACT

The electronic weight monitor of this invention comprises a control assembly including a switch operable to selectively control electric power to the weight monitor, a relay connected to an input contact to a switch, a lamp connected to a ground and to one of the output contacts of the relay, and a warning means connected to a ground and to the remaining output contact of the relay. A load cell housed in a container comprising a base having sidewalls and a lowermost terminal wall is provided. A platform having an uppermost terminal wall and sidewalls operable to slidably engage the sidewalls of the base, and an urging means operable to urge the base toward the platform are provided. The load cell includes a permanent magnetic field disposed in the base, and a reed-type switch which has one of its reeds connected to a ground and its opposing reed connected to the remaining input contact of the relay. The electronic weight monitor may include a magnetic field having adjusting means operable to selectively position the magnetic field relative to the base.

2 Claims, 2 Drawing Figures

ELECTRONIC WEIGHT MONITOR

FIELD OF INVENTION

The present invention relates to weight monitor apparatus, and more particularly to electronic weight monitor apparatus operable to indicate when a predetermined load mass has been accumulated.

DESCRIPTION OF THE PRIOR ART

Means commonly used and employed to indicate amounts of mass accumulated on vehicles, and the like, have commonly included scales. Overloading of the vehicle may be avoided only by weighing the vehicle and its contents on a weigher.

Accordingly, it is an object of the present invention to provide automatic weight monitoring means which may be provided on a vehicle.

It is a further object of this invention to provide weight monitor means which may be selectively controllable as to the amount of weight to be accumulated on the vehicle.

These and other objects shall become apparent from the description following, it being understood that modifications may be made without affecting the teachings of the invention here set out.

SUMMARY OF THE INVENTION

Generally, the electronic weight monitor of this invention comprises a control assembly including a switch selectively operable to control electric power to the weight monitor, a relay connected to an input contact to a switch, a lamp connected to a ground and to one of the output contacts of the relay, and a warning means connected to a ground and to the remaining output contact of the relay. A load cell housed in a container comprising a base having sidewalls and a lowermost terminal wall is provided. A platform having an uppermost terminal wall and sidewalls operable to slidably engage the sidewalls of the base and an urging means operable to urge the base toward the platform are provided. The load cell includes a permanent magnetic field disposed in the base, and a reed-type switch which has one of its reeds connected to a ground and its opposing reed connected to the remaining input contact of the relay. The electronic weight monitor may include a magnetic field having adjusting means operable to selectively position the magnetic field relative to the base.

A more thorough and comprehensive understanding may be had from the detailed description of the preferred embodiment when read in connection with the drawings forming a part of this specification.

Figure 1:
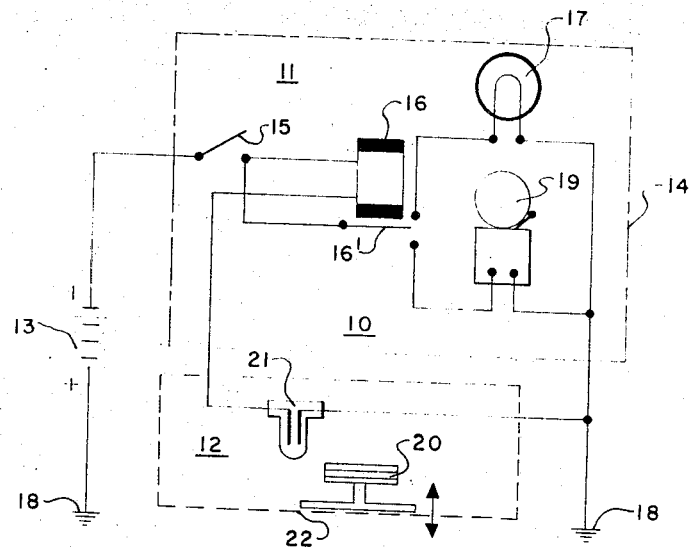
FIG. 1 is a schematic diagram of the electrical circuits of the electronic weight monitor of this invention.

DETAILED DESCRIPTION OF THE PREFERRED EMBODIMENT:

Referring now to the drawings, and more particularly to the FIG. 1, the electronic weight monitor of this invention is shown to advantage and identified by the numeral 10. The electronic weight monitor 10 is intended to be disposed on a material handling apparatus, such as a truck, conveyor, or the like. The electronic weight monitor 10 comprises a control assembly 11 and a load cell 12. The electronic weight monitor 10 is supplied with power from a suitable source, such as a battery 13.

The control assembly 11 is housed in a suitable container 14, shown in broken lines for illustrative purposes. Power from the battery 13 is selectively controlled to the electronic weight monitor 10 by means of a switch 15. The control assembly 11 is provided with a relay 16 having one of its input contacts connected to the switch 15. One output contact of the relay 16 is connected to a monitoring lamp 17, which is connected to a ground 18. The remaining output contact of the relay 16 is connected to one contact of a warning apparatus, such as a bell 19. Although a bell 19 is described in the preferred embodiment, any of a variety of other alarm devices, such as lights, buzzers, or the like, may be used satisfactorily. The remaining contact of the bell 19 is connected to the ground 18. In operation, when the switch is closed, the armature 16' of the relay 16 is operable to close the circuit for the lamp 17.

Figure 2:
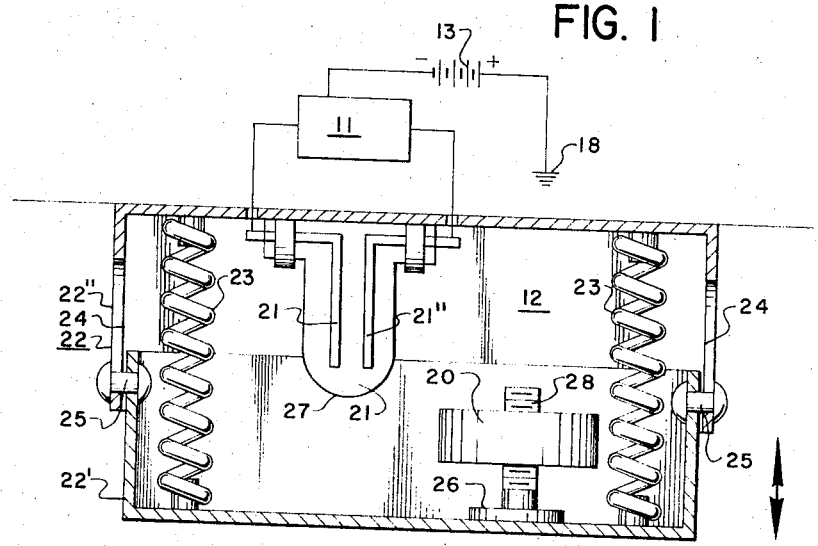
FIG. 2 is a schematic diagram of the electronic weight monitor of this invention including a cross-sectional view of the interior configuration of the load cell of this invention.

The load cell 12 includes a permanent magnetic field 20 and a reed-like switch 21. Referring now to the FIG. 2, the load cell 12 is housed in a container 22. The container includes a suitably configured base 22' having its lower terminal wall closed and its uppermost terminal side open. The container 22 also includes a platform 22' which is loosely slidably engageable and similarly configured to the base 22'. The platform 22'' is open on its lowermost terminal side and closed on its uppermost terminal wall. A suitable urging means, such as springs 23, are provided between the lowermost terminal wall of the base 22' and the uppermost terminal wall of the platform 22'. The sidewalls of the platform 22' are provided with overlapping, opposingly disposed slots 24; and the base 22' is provided with a corresponding number of outwardly projecting studs 25 which are operable as guides for the members 22' and 22''. A permanent magnet 20 is provided within the load cell container 22 on a pedestal 26 fastened to the lowermost terminal side of the base 22'. That is to say, the permanent magnet 20 is disposed distally from the lowermost terminal wall of the base 22' and away from stationary metal objects within the load cell 12. The reed switch 21 is fastened to the interior side of the uppermost terminal wall of the platform 22''. The reed switch 21 is provided with a pair of metal reeds 21' and 21'', and is enclosed in a nonmagnetic enclosure, such as a glass enclosure 27. One of the reeds 21' is connected to the remaining input contact of the relay 16. The opposing reed 21' of the reed switch 21 is connected to the ground 18, shown to better advantage in the FIG. 1.

In operation, the load cell 12 is suitably disposed between the load mass and the vehicle frame. When sufficient mass has been added to the load on the load cell 12, the reed switch 21 is caused to come into the magnetic field 20, resulting in a closed electric circuit. The resulting change in voltage causes the armature 16' of the relay 16 to simultaneously break the circuit to the lamp 17 and to activate the warning bell 19. It is to be understood that the amount of load mass to be monitored by the monitor 10 may be selectively controllable by providing the pedestal 26 with adjusting means, such as threads 28, which are operable to selectively raise and lower the magnet 20, thus controlling the point at which the reed switch 21 is activated during compression of the cell 12.

Having thus described in detail a preferred apparatus which embodies the concepts and principles of the invention and which accomplishes the various objects, purposes and aims thereof, it is to be appreciated and will be apparent to those skilled in the art that many physical changes could be made in the apparatus without altering the inventive concepts and principles embodied therein. Hence, it is intended that the scope of the invention be limited only to the extent indicated in the appended claims.

I claim:

1. An electronic weight monitor comprising
    a control assembly including a switch operable to control electric power to said weight monitor, a relay connected at one of its input contacts to said switch, a lamp connected to a ground and to one of the output contacts of said relay, and a warning means connected to said ground and to the remaining output contact of said relay; and
    a load cell housed in a container comprising a base having sidewalls and a lowermost terminal wall, a platform having an uppermost terminal wall and sidewalls operable to slidably engage said sidewalls of said base, and urging means operable to urge said base and said platform apart, said load cell including a permanent magnetic field disposed in said base, and a reed switch having one of its reeds connected to said ground and its opposing reed connected to the remaining input contact of said relay.

2. The apparatus of claim 1, wherein said magnetic field includes adjusting means operable to selectively position said magnetic field relative to said lowermost terminal wall of said base.

* * * * *